United States Patent [19]
Roberts

[11] 4,035,579
[45] July 12, 1977

[54] PULSE-CODE MODULATED VIDEO REPRODUCER UTILIZING LINEAR ARRAYED LENSES

[75] Inventor: Donald L. Roberts, San Diego, Calif.

[73] Assignee: NCR Corporation, Dayton, Ohio

[21] Appl. No.: 601,241

[22] Filed: Aug. 1, 1975

[51] Int. Cl.² .......................................... H04N 5/84
[52] U.S. Cl. ............................................... 358/130
[58] Field of Search ............................. 178/6.7 R

[56] References Cited
U.S. PATENT DOCUMENTS

| | | | |
|---|---|---|---|
| 3,299,434 | 1/1967 | McNaney | 178/6.7 R |
| 3,688,045 | 8/1972 | Ohkoshi | 178/6.5 |
| 3,767,850 | 10/1973 | McMillan | 178/6.7 R |
| 3,803,353 | 4/1974 | Sanderson | 178/7.7 |

Primary Examiner—Thomas B. Habecker
Attorney, Agent, or Firm—J. T. Cavender; Edward Dugas

[57] ABSTRACT

A video playback system utilizing a vertically moving strip of photosensitive film on which linear bit fields containing a pulse-code modulated (PCM) representation of a television picture have been recorded. The system includes an illuminating means which successively scans a horizontal line of bit fields. Magnifying optics include a linear multiple lens array and a correction lens assembly. As each bit field in the line is successively illuminated, the magnifying optics project an image of the bit field to a linear detector array. Digital information from each bit field is transferred to a buffer; the digital information is converted to analog video signals and applied to the input of a video utilization device. Vertical registration is accomplished by detecting servo information recorded on the film and optically slaving the film drive system to the scanning operation.

2 Claims, 5 Drawing Figures

PULSE-CODE MODULATED VIDEO REPRODUCER UTILIZING LINEAR ARRAYED LENSES

BACKGROUND OF THE INVENTION

The present invention relates to video reproducers, and more particularly to a system for playback of pulse-code modulated video signals recorded on a photosensitive storage medium.

While typical present-day video recording and playback systems generally record analog signals on storage media such as magnetic tape, photosensitive film, etc., a need arises for direct recording and playback of digitally encoded video signals such as those which may be received over multiplex common carrier facilities or from deep-space probes. Further application for such a system is found in commercial playback apparatus utilizing optical recording media such as photographic film because of the ability to achieve extremely efficient, low-cost reproduction of the film, as for example, by a diazo process.

It is, therefore, a principal object of the present invention to provide a new and improved video playback system.

A particular object of the present invention is to provide a video playback system which is compatible with pulse-code modulated video signals.

Another object of the invention is to provide a new and improved video playback system utilizing a recording medium which is easily reproducible for wide distribution at a relatively low cost when compared with analog recorded media.

It is another object of the present invention to provide a new and improved video playback system utilizing a storage medium and recording method which is compatible with existing optical memories storing digital data.

SUMMARY OF THE INVENTION

A video reproducer in accordance with the present invention includes a linear scanning illumination means successively projecting images of a plurality of linear fields of discrete digital indicia recorded on a continuously moving photosensitive storage medium onto a linear detector array. The projected images are magnified by an optical system comprising a multiple lens array. The detected digital data is buffered and converted to analog video signals for display.

BRIEF DESCRIPTION OF THE DRAWINGS

The invention is pointed out with particularity in the appended claims; however, other features and advantages of the invention will become more apparent and the invention will be best understood by referring to the following detailed description in conjunction with the accompanying drawings, in the several figures of which like characters of reference identify like elements, and in which:

DESCRIPTION OF THE PREFERRED EMBODIMENT

Figure 1:
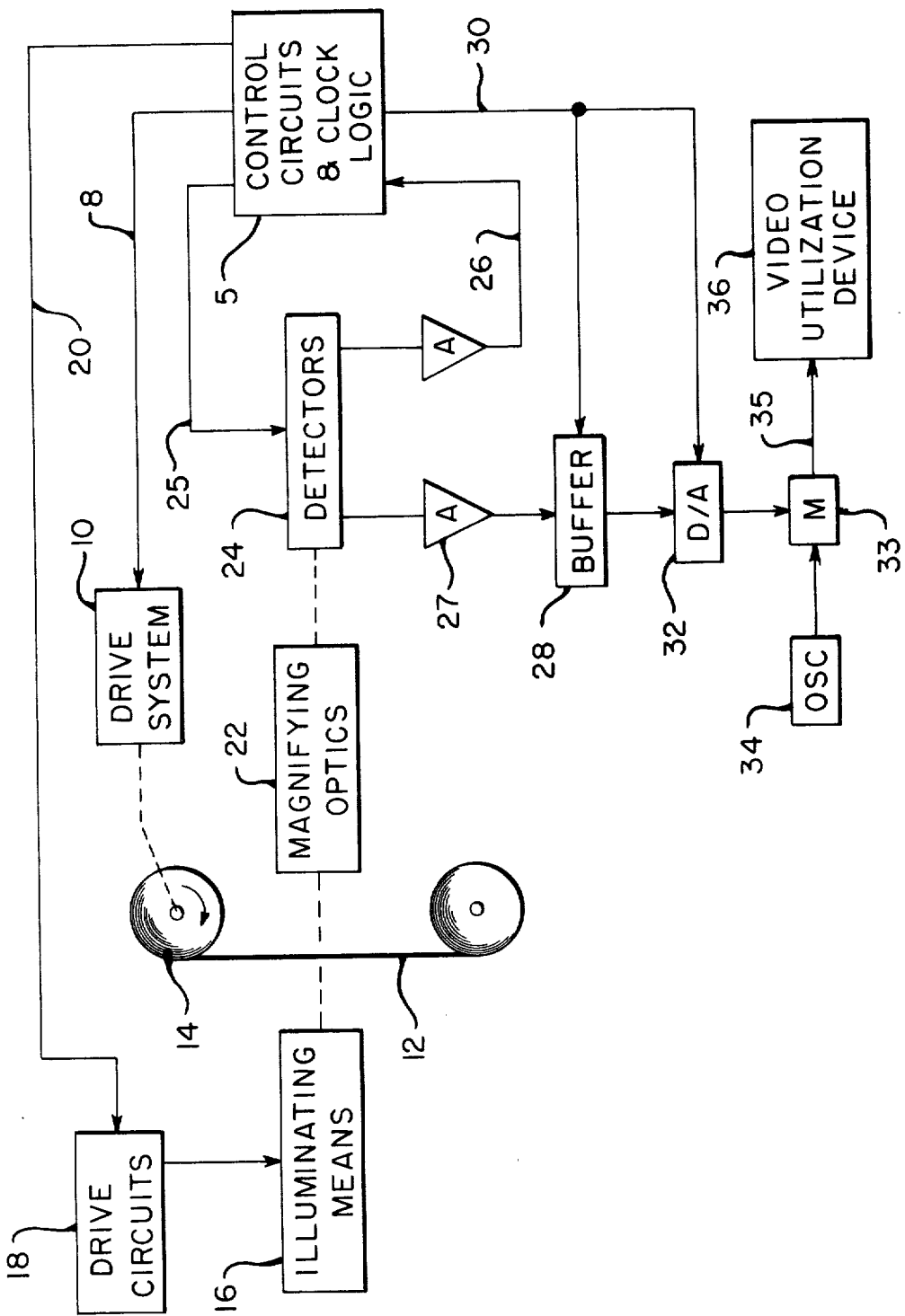
FIG. 1 is a block diagram of a video player in accordance with the present invention.

Referring now to the various views of drawing for a detailed description of the construction, operation and other features of the invention by characters of reference, FIG. 1 illustrates a block diagram of a video player wherein control circuits 5 generate a signal via a line 8 to actuate a drive system 10 for continuously moving a storage medium 12, which in the preferred embodiment is a reel 14 of photographic film. Digital indicia representative of a video display are stored on the film 12. Indicia utilized for synchronizing movement of the storage medium 12 with the recovery of data therefrom are also stored on the film 12. An illuminating means 16, in response to control signals selectively applied to drive circuits 18 via a line 20 from the control circuits 5, illuminates selected segments of the film 12. Light from the illuminating means 16 transmitted through the film 12 and magnifying optics 22 projects an image of the synchronizing indicia on detectors 24. The control circuits activate the detectors 24 via a line 25 to sense the synchronizing indicia and develop synchronizing signals therefrom. The detected synchronizing signals are amplified and transferred via a line 26 to the control circuits and clock logic 5 where appropriate timing signals are developed for controlling operation of the video player. The clock logic 5 further activates the detectors 24 via line 25 to sense fields of stored binary digits representative of the video display to be reproduced. The detected binary digits are transferred as digital signals via ammplifiers 27 to a buffer 28 in response to timing signals received in the buffer 28 via a line 30 from the control circuits and clock logic 5. The output of the buffer 28 is transferred to a digital-to-analog (D/A) converter 32, the output of which is supplied to a modulator 33 and impressed on a suitable carrier from oscillator 34. The modulator output 35 may be applied to the input of a video utilization device 36, which may be, for example, a standard television set.

Figure 2:
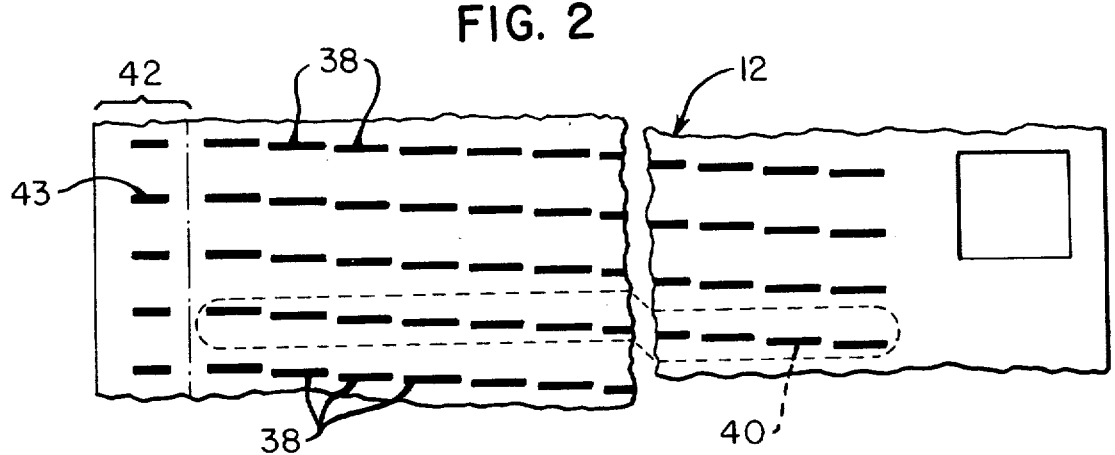
FIG. 2 illustrates a typical format of data stored on the storage medium.

Referring now to FIG. 2, the format of the digital data recorded on the storage medium 14 is shown. Typically, a plurality of bit fields 38 are recorded in substantially horizontal rows such as the row 40 across the film 12. Each row exhibits a slight vertical displacement or skew, exaggerated in FIG. 2 for clarity, between adjacent bit fields 38 due to movement of the recording medium 12. The bit fields 38 each comprise a linear string of binary indicia representative of pulse-code modulated video data stored as transparent spots on the photographic film 12. Redundancy reduction coding may be utilized to reduce the number of bits stored. A servo area 42 of the film 12 contains encoded data items 42 utilized by the control circuits and clock logic 5 (FIG. 1) for slaving the movement of the film 12 to the operation of the video playback system.

Figure 3:
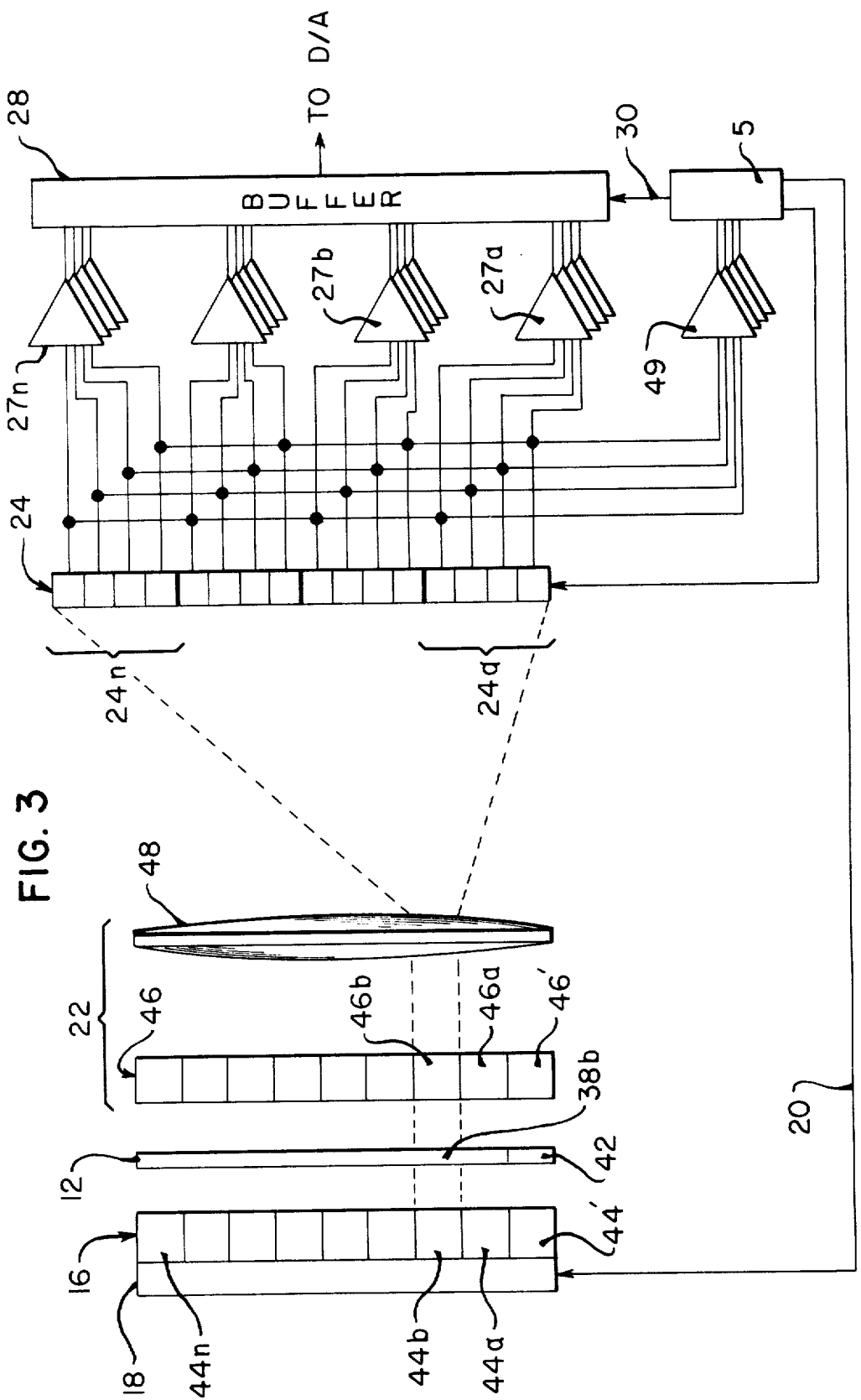
FIG. 3 is a pictorial diagramm of one embodiment of the invention.

Referring now to FIG. 3 in conjunction with FIG. 1, one embodiment of the video player utilizes an illuminating means 16 comprising a linear array of GaAlAs light-emitting diodes (LED) 44', 44a–44n. Each of the diodes 44 corresponds with one of the bit fields in a row of recorded data of the storage medium 12, and each is individually accessible for illumination in response to control signals received by drive circuits 18 via the line 20. The storage medium 12 is disposed between the LED array 16 and a multiple lens array 46. Movement of the film 12 with respect to FIG. 3 is perpendicular to the plane of the view, the horizontal rows 40 (FIG. 2) of bit fields 38 disposed vertically in the FIG. 3 view. The multiple lens array, part of the magnifying optics 22, comprises a linear array of lenslets 46', 46a–46n. Each of the lenslets 46', 46a–46n corresponds with a different one of the LEDs 44', 44a–44n. A correction lens 48 is disposed intermediate the multiple lens array 46 and a linear photodetector array 24. The detector array 24 comprises at least the same number of elements as the number of binary digits in each of the bit fields 38. Typically, a bit field is detected by illuminating the LED such as the exemplary LED 44b adjacent the bit field 38b to be accessed. Light projected through the exemplary bit field 38b is magnified by the lenslet 46b and the correcting lens 48, and projected onto the linear detector array 24. A detector array suitable for use with the present invention is disclosed in U.S. Pat. No. 3,855,582 entitled PARALLEL BIASED PHOTODETECTOR MATRIX which issued to the undersigned on Dec. 17, 1974, and is assigned to the same assignee as the present invention.

The detector 24 is typically segmented into self-scanning groups of diodes as represented by the groups 24a–24n of FIG. 3. The contents of the groups of diodes are gated through corresponding amplifiers and pulse shaping networks 27a–27n at a workable rate, e.g., 10 MHz, and loaded into a TV line buffer 28. In the presently described embodiment, the exemplary LED 44b is on for approximately 2.4 microseconds, and approximately 1.6 microseconds is allowed for readout of the detector array 24. After approximately 4 microseconds the next LED in succession is illuminated in response to a control signal received via the line 20 from the control circuits and clock logic 5, and the same sequence as with readout of the exemplary bit field 38b is repeated.

As the film moves continuously between the LED array 16 and the multiple lens array 46, synchronization data items optically encoded on the servo area 42 of the film 12 are sensed to determine the firing time of the initial LED 44a for each row of bit fields. LED 44' is illuminated initially until the servo data item for the particular row 40 passing is detected by detectors 24 and transferred via amplifiers 49 to the control circuits and clock logic 5. The clock logic 5 then effects firing of succeeding LEDs such that the bit fields of a row of data 40 on the film are imaged successively onto the detector array 24 as each LED 22a–44n is fired in succession. As the sequence continues and each of the LED's has fired a sufficient number of times a complete TV line is loaded into the buffer 28.

As the buffer 28 is loaded with digital data representative of a line or scan of video information, it is unloaded one section at a time at an equivalent rate of 80 MHz under control of timing signals transferred via the line 30 from the central control 5. An 80 MHz rate assumes a high-quality video display, i.e., modulo 8 PCM samples, of the conventional type video scan as utilized in the United States. A display having a slower scan and/or pulse-code modulation utilizing fewer digits per sample, e.g., modulo 5 or 6, may be implemented at a correspondingly narrower bandwidth. The input loading frequency of the buffer is approximately 60 MHz continuously. The data unloads in 80 MHz bursts of digitally encoded video information, the off-time being utilized for flyback.

Figure 4:
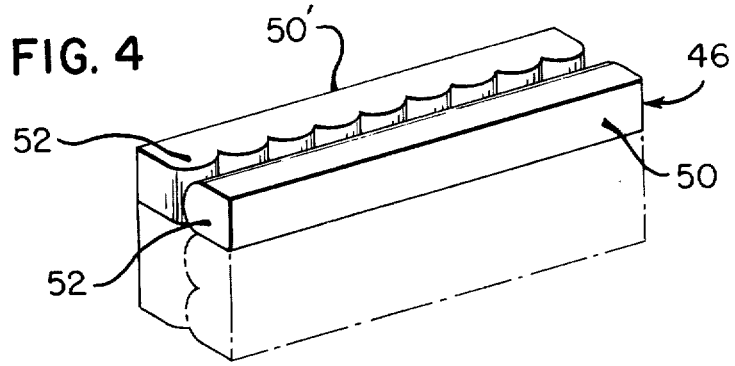
FIG. 4 is a pictorial diagram of a linear multiple lens array.

Attention is now directed to FIG. 4 which illustrates a multiple lens array 46. The multiple lens array 46 is fundamental component of the video player system such that a brief description of its characteristics is deemed useful to a complete understanding of the invention. Briefly, the multiple lens array 46 comprises similar unitary planar elements 50 and 50', each formed from a plastic substrate and having parallel corrugations or cylindroidal elements 52 on one face thereof. The multiple lens array 46 of FIG. 4 is depicted as a linear array, the unitary element 50 having only a single corrugation being formed from a larger generally planar substrate, which is shown in FIG. 4 in dashed outline. The unitary elements 50, 50' are oriented with the faces carrying the corrugation 52 crossed at 90° in relation to one another, and brought together to form a square lenslet at each intersection of the corrugations. Twenty-five parallel corrugations per centimeter, a conservative density at the state-of-the-art, provides a linear array of approximately 75 lenslets disposed across a standard 35 millimeter film strip. Each lenslet has a speed in the range of $f$-2.7 to $f$-3.2 with resolution capability of 400–500 lines per millimeter.

The unitary elements 50, 50' are very uniform as a consequence of the fabrication technique employed. A metal negative master can be prepared with a linear or Bonnet rotary ruling engine, and array elements are then cast from the master. At the state-of-the-art, the center-to-center accuracy of the lenslets is better than 0.2 micrometers per centimeter, and the focal-length tolerance is better than 1/10 of 1%.

Figure 5:
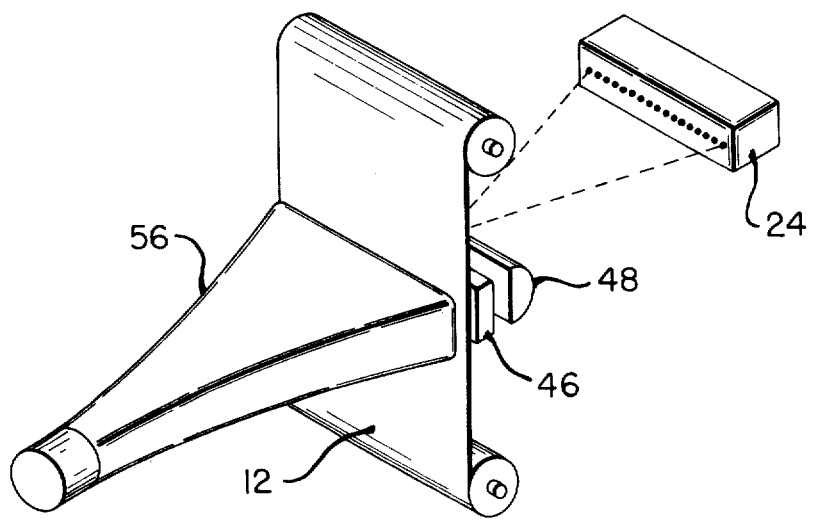
FIG. 5 is a pictorial view of another embodiment of an optical system in a video player in accordance with the present invention.

FIG. 5 shows another embodiment of the invention wherein a cathode ray tube (CRT) having a linear scan is utilized for the illumination means. As the film 12 moves continuously between the CRT 56 and the multiple lens array 46, each of the passing bit fields is successively illuminated and the recorded indicia therein projected through the corresponding lenslet of the multiple lens array 46 and the correcting lens 48, and imaged on the linear detector array 24.

While the principles of my invention have been made clear in the foregoing description, it will be immediately obvious to those skilled in the art that many modifications of the structure, arrangement, proportion, the elements, material and components may be used in the practice of the invention which are particularly adapted for specific environments without departure from those principles. The appended claims are intended to cover and embrace any such modifications within the limits only of the true spirit and scope of the invention.

What is claimed is:

1. A video playback system, comprising:
   a storage medium having discrete indicia recorded thereon representative of a video-display signal, said indicia forming a plurality of linearly ordered fields of data on said medium;
   a source of illumination;
   means for directing said illumination to a line of said plurality of linearly ordered data fields in succession to project an image of said indicia;
   means for magnifying said image, said magnifying means including an optical array having at least two unitary elements forming a multiplicity of lenslets each formed of a substrate having cylindroidal corrugations on one face thereof, said faces brought together with said corrugations mutually perpendicular to form at each intersection thereof one of said multiplicity of lenslets, each of said lenslets corresponding with a different one of the data fields in said line of linearly ordered data fields;

means for receiving each of said magnified images in succession and including means for detecting said indicia;

means for converting said detected indicia to said video-display signal; and means for utilizing said video-display signal.

2. A video playback system, comprising:

a storage medium having discrete indicia recorded thereon representative of a video-display signal, said indicia forming a plurality of linearly ordered fields of data on said medium;

a source of illumination;

means for directing said illumination to a line of said plurality of linearly ordered data fields in succession to project an image of said indicia;

means for magnifying said image, said magnifying means including an optical array having at least two unitary elements forming a multiplicity of lenslets, with each of the multiplicity of lenslets being of a square configuration comprising a pair of opposed cylindroidal elements crossed at 90° with one another, further each of said lenslets corresponding with a different one of the data fields in said line of linearly ordered data fields;

means for receiving each of said magnified images in succession and including means for detecting said indicia;

means for converting said detected indicia to said video-display signal; and means for utilizing said video-display signal.

* * * * *